(No Model.)
A. NOLL.
CONDUIT FOR ELECTRIC CONDUCTORS.
No. 481,912. Patented Aug. 30, 1892.
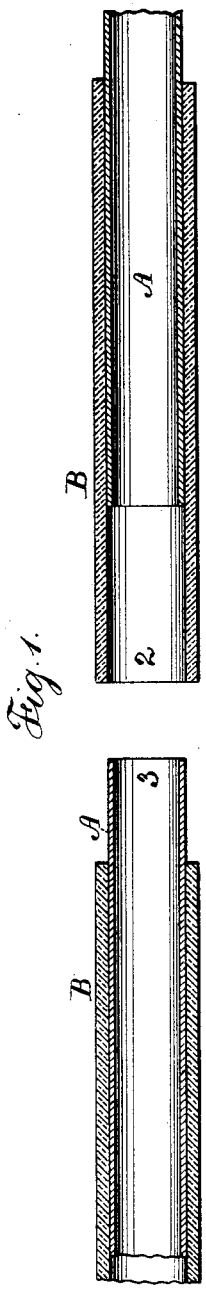
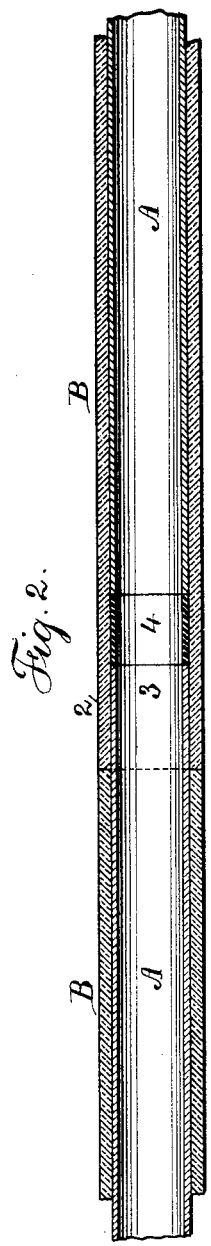
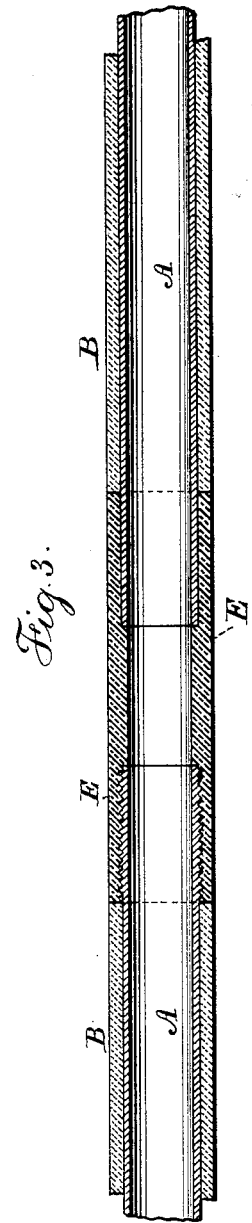
Witnesses:
J. Staib
Chas. H. Smith
Inventor:
Augustus Noll
per Lemuel W. Serrell
Atty.

UNITED STATES PATENT OFFICE.

AUGUSTUS NOLL, OF MOUNT VERNON, NEW YORK, ASSIGNOR TO ABNER J. TOWER, TRUSTEE, OF BOSTON, MASSACHUSETTS.

CONDUIT FOR ELECTRIC CONDUCTORS.

SPECIFICATION forming part of Letters Patent No. 481,912, dated August 30, 1892.

Application filed April 28, 1892. Serial No. 431,010. (No model.)

*To all whom it may concern:*

Be it known that I, AUGUSTUS NOLL, a citizen of the United States, residing at Mount Vernon, in the county of Westchester and State of New York, have invented an Improvement in Conduits for Electric Conductors, of which the following is a specification.

Electric conductors for wiring houses have heretofore been covered with india-rubber, gutta-percha, or a winding or braiding of cotton or other material by which such wire is insulated, and such conductors have been introduced into metallic tubes or cases, and in other instances the tubes or cases have been of insulating material. Where metallic tubes have been employed, difficulties have been experienced in consequence of the covering of the conductor becoming injured and the current short-circuited by the contact of the conductor with the tube or case, and where insulating material alone has been depended upon the same is liable to be broken and injured by the plaster, or by acids or moisture, or by the current. The insulation is frequently heavy and bulky in order to obtain the necessary strength.

My present invention combines the advantageous features of the metallic conduit and the conduit of insulating material; and the object of my invention is to produce a conduit especially adapted to the wiring of houses, vessels, and other structures for electric lighting, &c., and in which the conduit will have sufficient rigidity to retain its shape and character under the ordinary conditions of use, and so that the electric conductors are protected from injury and the possibility of fire from electric sparks is prevented.

In the drawings, Figure 1 is a longitudinal section representing two ends of a conduit adapted to be joined together. Fig. 2 is a similar view with the ends united, and Fig. 3 is a longitudinal section of a modification.

I make use of metal tubes A A, which are of the desired size and thickness for obtaining the necessary strength, so as to receive one, two, or more insulated conductors within the tube, and these tubes are of greater or less length, according to the circumstances and positions in which they are used, and these metal tubes A are covered with an insulating material B of any suitable character. It is preferable to employ an insulating material that is fireproof as well as waterproof and sufficiently tenacious to prevent the insulation being knocked off or broken under the ordinary circumstances of use, and such insulating material should not be injured by the plaster or cement of the walls. Each tube is covered with the insulating material, and the insulating material is allowed to project beyond one end of each metal tube, as seen at 2, and the end 3 of the adjacent metal tube projects a less distance from the insulating material B than the insulating material of the adjacent tube, so that when the end 3 of the metal tube is inserted into the projecting portion 2 of the insulating material there will be a space between the ends of the metal tubes, in order that one metal tube may be entirely insulated from the next, and this mode of introducing one tube into the other is maintained throughout the whole of the conduit, in order that each metal tube may be entirely insulated. In joining up these tubes a suitable cement can be applied around the projecting end 3 of the metal tube, so that when it is inserted into the end 2 of the insulating material the two parts are firmly united together, or there may be a screw-thread cut around the projecting end of the metal tube, so as to screw the same into the insulating material of the next tube, and I remark that usually the insulating material is of such a character that the screw-thread on the metal tube will embed itself into the insulating material; but a screw-thread may be cut on the interior of the insulating-tube, into which the adjacent metal tube is screwed, and I prefer to make use of an insulating-collar 4 between the ends of the metal tubes, so that the interior surfaces of the tubes may be smooth and in line with each other to facilitate the drawing in of the insulated conductor. In preparing the ends of the tubes to set together any suitable tools may be employed.

By this improvement I am enabled to obtain a very strong conduit for the insulated electric conductors, and should there be any defect in the insulating material that is wound around the conductor, so that the wire comes in contact with either metal-tube section of the conduit, the current is not short-circuited, because the tube-sections of the conduit are insulated and of comparatively short lengths, and should a conducting-wire be broken and the ends project, so as to come into contact with the interior surface of the conduit-tube, the metal will prevent the circuit being broken, and should the current be sufficient the ends of the conductor may become fused or welded to the interior of the metallic-tube section in the conduit, and thus maintain the circuit in an unbroken condition.

By this improvement the inner surfaces of the tubes are kept in alignment without shoulders or projections and the bore of the tube is smooth, so that the covered electric conductors are easily drawn in, and should there be any defect in the electric circuit it can be more easily discovered and rectified by tests applied at small openings made through the insulating material, so as to discover any contacts or ground to any section of the conduit, and where this conduit is employed for telephones the ends of the metallic tubes can be brought into direct contact with each other, so that there may be a return-conductor composed of the metallic-tube sections.

In Fig. 3 a conduit the same as that before described is represented, except that a coupling E, of insulating material, is represented as surrounding the ends of the adjacent tubes.

I claim as my invention—

1. The conduit for electric conductors, composed of metallic-tube sections inclosed in tubular coverings of insulating material, there being tubular insulating material forming the connection between one metallic-tube section and the next, substantially as specified.

2. A conduit for electric conductors, composed of metallic-tube sections and a tubular covering of insulating material upon each tube-section, the insulated tubular covering projecting at one end of each section, so as to receive into it the projecting metallic tube of the next section, the parts being secured together, substantially as set forth.

3. The conduit for electric conductors, composed of metallic-tube sections, each tube-section being inclosed in a tubular covering of insulating material, the metal tube of one section passing into the end of the tubular covering of the next section, there being an insulating-washer between the ends of the metallic tubes, substantially as set forth.

Signed by me this 19th day of April, 1892.

AUGUSTUS NOLL.

Witnesses:
GEO. T. PINCKNEY,
WILLIAM G. MOTT.